Patented Apr. 6, 1926.

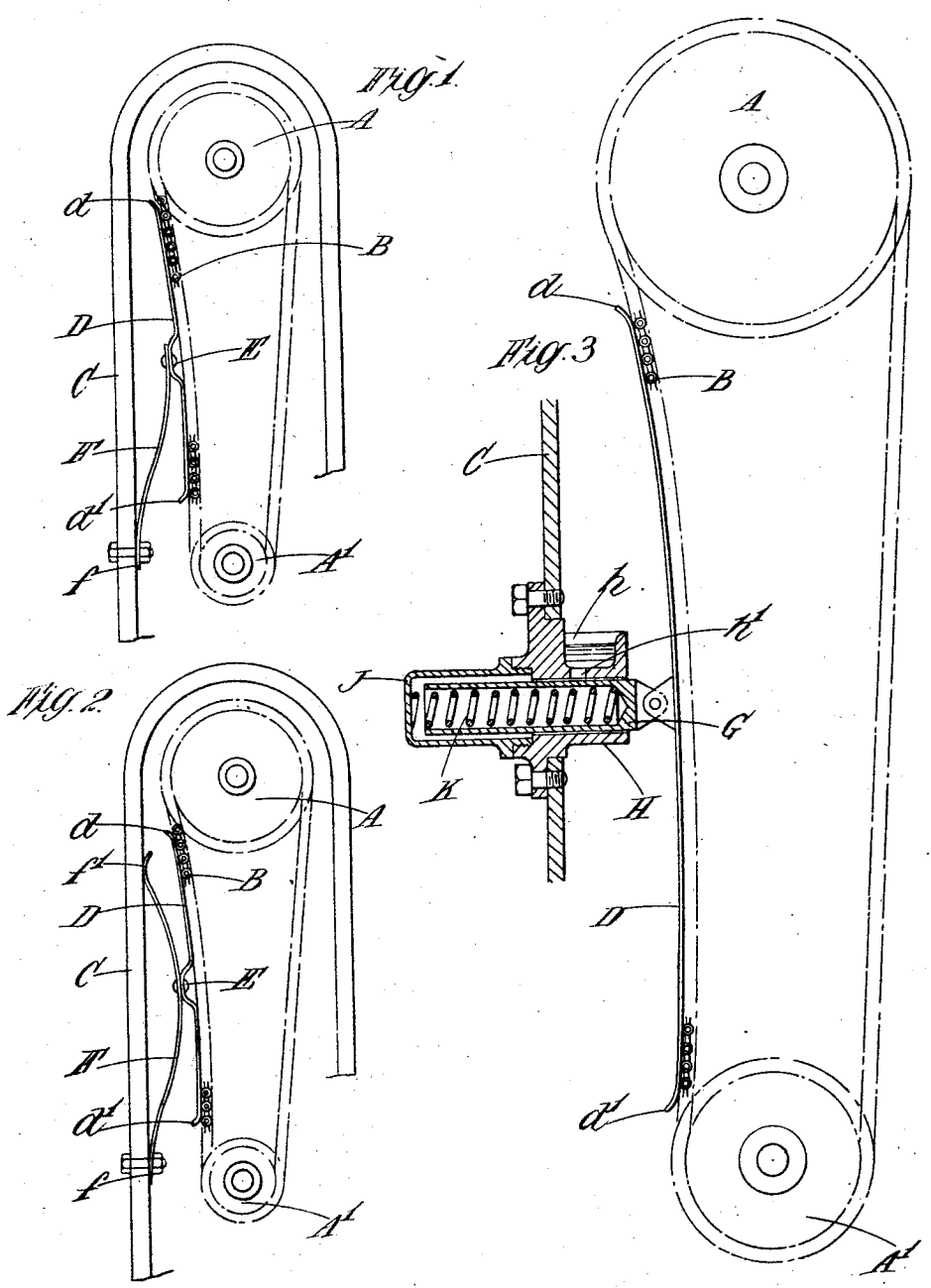

1,579,681

UNITED STATES PATENT OFFICE.

JOHN WELLER, OF GREAT BOOKHAM, ENGLAND.

MEANS FOR TRANSMITTING MOTION.

Application filed December 23, 1924. Serial No. 757,617.

*To all whom it may concern:*

Be it known that I, JOHN WELLER, a subject of the King of Great Britain, residing at "Amberley," Great Bookham, in the county of Surrey, England, have invented certain new and useful Improvements in Means for Transmitting Motion, of which the following is a specification.

This invention relates to means for transmitting motion and particularly to devices for use with motion transmitting or driving chains for taking up the slack in the chain which arises for example as the result of wear.

According to my invention the device comprises a thin flexible member or blade having its extremities unsupported and adapted to be pressed against the chain progressively and unrestrainedly by means of pressure derived for example from a spring and applied to said member between its extremities preferably at or about a point midway of its length so that, its extremities being left free, the member is able to readily conform throughout its length with the shape taken up by the chain between its driving and driven elements and press against it with a pressure distributed evenly over the entire length of said member.

I may provide in conjunction with said device means for damping or preventing the oscillations of the chain which are set up for example, as the result of a rapidly fluctuating load thereon and said means may be in the nature of a frictional or other resistance contrivance or in the nature of a dash pot.

In order that the said invention may be clearly understood and readily carried into effect the same will now be described more fully with reference to the accompanying drawings in which:—

Figure 1 illustrates my improved device applied to the driving chain between two chain wheels forming part of the valve operating mechanism of an internal combustion engine, and in which the pressure applied to the member is a continuous one.

Figure 2 is a similar view to Figure 1 showing a frictional arrangement for damping out oscillations of the chain, and Figure 3 illustrates on a larger scale a further modification of the device.

A, A' are the two chain wheels and B is the endless chain which connects them. C represents part of the casing in which the chain wheels and chain are contained which casing is usually closed by a cover as is well understood. D is the thin flexible member comprising a blade of thin spring steel having its ends bent up at $d, d'$.

In Figures 1 and 2 the said member is attached by rivets E at a point between its extremities to a leaf spring F which is fixed at its lower end $f$ to a suitable part of the inside of the casing C, said spring acting to press the member D against the chain B and thereby take up any slack which may develop by still further pressing the chain inwardly. By attaching the said member D to the spring F at a point between its extremities as aforesaid the ends of the member D are left free so that the member can readily conform throughout the whole of its length to the shape taken up by the chain between the two chain wheels A, A', and by applying the pressure at the middle of the said member as shown the latter is pressed against the chain with a pressure evenly distributed over the length of said member. In Figure 2 the leaf spring F is made longer than in Figure 1 and curved or bowed so that its free end $f'$ presses against the inside of the casing C the friction between the free end of the spring and the inside of the casing as the former rubs against it acting to damp the oscillations of the chain.

In Figure 3 the member D is pivotally attached to a hollow plunger G slidably mounted in a cylinder H attached to the casing C and having a fluid containing chamber J. K is a spiral spring adapted to bear at one end against the closed end of the chamber J and at the other end against the inner end of the hollow plunger G, said spring operating to continuously press the hollow plunger outwards and the member D carried thereby against the chain B. The cylinder H is formed or provided with a cup or container $h$ having a passage $h'$ through which fluid which may be the lubricating oil used for the moving parts of the gearing can reach the interior of the cylinder H by passing along the clearance existing between the plunger and the cylinder or by any other suitable duct provided for that purpose. By this means additional oil can enter the fluid containing chamber J as its capacity is increased by the outward movement of the plunger due to increasing slack in the chain B or to compensate for any leakage of the oil from the said chamber thereby always keeping the fluid containing chamber J full.

By adjusting the area of the communicating passage $h'$ between the cup or container $h$ and the fluid containing chamber J the flow of oil therethrough can be controlled so that while sufficient to convey additional oil to the fluid containing chamber J under the suction of the plunger G during its gradual outward movement, is not sufficient to permit a rapid return, thus preventing a reciprocating movement of the plunger due to the tendency of the chain B to oscillate under fluctuating loads. If it is desired to obtain a more elastic or dash pot effect the clearance between the plunger G and the cylinder H may be increased so that oil can escape between the plunger and the cylinder when the former moves inwardly. The cup or container $h$ is, in the example shown open ended so that it can be kept supplied with the lubricating oil which is splashed up in the casing by the driving mechanism during working.

What I claim and desire to secure by Letters Patent of the United States is:—

1. A device for taking up the slack in a motion transmitting chain comprising a thin flexible member having its extremities unsupported and means for progressively and unrestrainedly pressing said member against the chain.

2. A device for taking up the slack in a motion transmitting chain comprising a thin flexible member having its extremities unsupported and means for progressively and unrestrainedly pressing said member at a point between its extremities against the chain.

3. A device for taking up the slack in a motion transmitting chain comprising a thin flexible member having its extremities unsupported and means for progressively and unrestrainedly pressing said member midway of its length against the chain.

4. A device for taking up the slack in a motion transmitting chain comprising a thin flexible member having its extremities unsupported, means for exerting progressive and unrestrained pressure on said member between its extremities in a direction against the chain and means for restraining return movement of said member.

5. A device for taking up the slack in a motion transmitting chain comprising a thin flexible member having its extremities unsupported, means for progressively and unrestrainedly pressing said member against the chain and means for damping or preventing oscillations of said chain.

6. A device for taking up the slack in a motion transmitting chain comprising a thin flexible member having its extremities unsupported, means for exerting continuous pressure on said member against the chain and a dash pot device for damping oscillations of said chain.

7. A device for taking up the slack in a motion transmitting chain comprising a thin flexible member having its extremities unsupported, a plunger attached to said member between its extremities, a stationary fluid-containing cylinder in which said plunger slides, and means for pressing said plunger and said member outwardly against the chain.

8. A device for taking up the slack in a motion transmitting chain comprising a thin flexible member having its extremities unsupported, a plunger pivoted to said member between its extremities, a stationary oil-containing cylinder in which said plunger slides, means for pressing said plunger and said member outwardly against the chain, means for restricting the flow of the oil from said oil-containing cylinder and means for supplying oil to said oil-containing cylinder.

9. A device for taking up the slack in a motion transmitting chain comprising a thin flexible member having its extremities unsupported, a plunger pivoted to said member between its extremities, a stationary oil-containing cylinder in which said plunger slides, a spring for pressing said plunger and said member continuously outward against the chain, means for restricting the flow of the oil from said oil-containing cylinder and an oil receptacle communicating with said cylinder for supplying additional oil to said oil-containing cylinder.

10. A device for taking up the slack in a motion transmitting chain comprising a thin flexible member having its extremities unsupported, a hollow plunger pivoted to said member midway of its length, a stationary oil-containing cylinder in which said hollow plunger slides, a helical spring for pressing said hollow plunger and said member continuously outward against the chain, means for restricting the flow of the oil from said oil-containing cylinder and an open-ended oil receptacle communicating with said cylinder for receiving and supplying additional oil to said oil-containing cylinders.

JOHN WELLER.